United States Patent
Geloen

(10) Patent No.: US 9,733,476 B2
(45) Date of Patent: Aug. 15, 2017

(54) IMAGE TRANSMISSION DEVICE FOR A DISPLAY AND HEAD-UP DISPLAY EQUIPPED WITH SAID DEVICE

(71) Applicant: Valeo Etudes Electroniques, Creteil (FR)

(72) Inventor: Richard Geloen, Creteil (FR)

(73) Assignee: Valeo Etudes Electroniques, Creteil (FR)

( * ) Notice: Subject to any disclaimer, the term of this patent is extended or adjusted under 35 U.S.C. 154(b) by 0 days.

(21) Appl. No.: 14/758,096

(22) PCT Filed: Dec. 10, 2013

(86) PCT No.: PCT/FR2013/000330
§ 371 (c)(1),
(2) Date: Jun. 26, 2015

(87) PCT Pub. No.: WO2014/102463
PCT Pub. Date: Jul. 3, 2014

(65) Prior Publication Data
US 2015/0355460 A1   Dec. 10, 2015

(30) Foreign Application Priority Data
Dec. 28, 2012 (FR) .................... 12 62915

(51) Int. Cl.
| | | |
|---|---|---|
| G02B 27/14 | (2006.01) | |
| G09G 5/00 | (2006.01) | |
| G02B 27/01 | (2006.01) | |
| G02B 27/10 | (2006.01) | |
| F21V 8/00 | (2006.01) | |
| G02F 1/1333 | (2006.01) | |

(52) U.S. Cl.
CPC ....... *G02B 27/0101* (2013.01); *G02B 6/0068* (2013.01); *G02B 27/10* (2013.01); *G02F 1/133385* (2013.01); *G02B 2027/013* (2013.01)

(58) Field of Classification Search
CPC .. G02B 27/0101; G02B 6/0068; G02B 27/10; G02B 2027/013
USPC .......................... 359/630, 631, 636; 345/7, 9
See application file for complete search history.

(56) References Cited

U.S. PATENT DOCUMENTS

| | | | |
|---|---|---|---|
| 2011/0128543 A1 | 6/2011 | Choi | |
| 2012/0098819 A1* | 4/2012 | Furuya | G02B 5/32 345/212 |

FOREIGN PATENT DOCUMENTS

| | | |
|---|---|---|
| DE | 42 11 728 A1 | 10/1993 |
| WO | 2009/101236 A1 | 8/2009 |

OTHER PUBLICATIONS

International Search Report issued in PCT/FR2013/000330 mailed on Mar. 6, 2014 (2 pages).

* cited by examiner

*Primary Examiner* — Alicia M Harrington
(74) *Attorney, Agent, or Firm* — Osha Liang LLP

(57) ABSTRACT

An image transmission device for a display intended to display a virtual image in a driver's field of view is disclosed. The transmission device includes a semi-reflective optical element configured to transmit light rays that can be used to display the virtual image in the field of view. The optical element is also configured to guide the light. A light source emitting a light beam is also part of the device, where the light source and the optical element are located relative to one another so that the beam is emitted by the optical element operating as a light guide.

16 Claims, 1 Drawing Sheet

Figure 1:
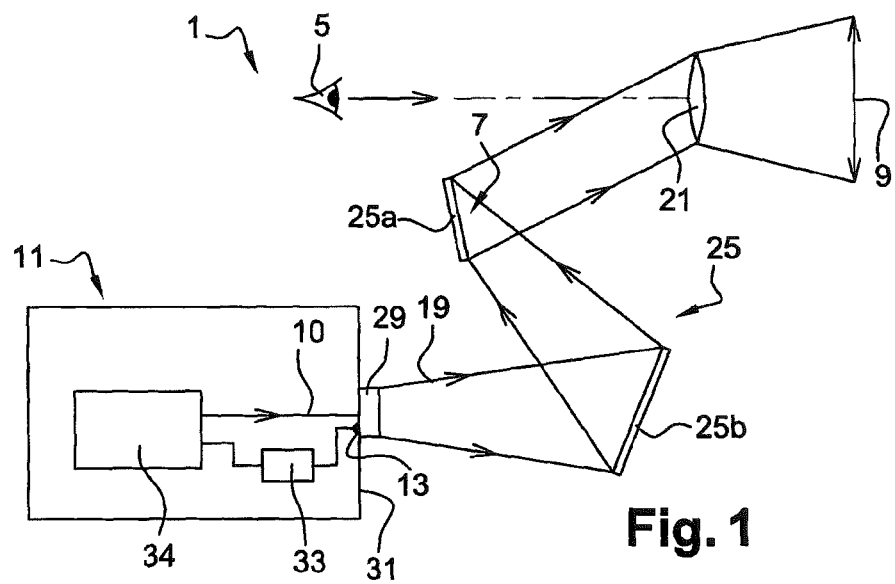

IMAGE TRANSMISSION DEVICE FOR A DISPLAY AND HEAD-UP DISPLAY EQUIPPED WITH SAID DEVICE

The invention relates to an image transmission device for a display intended to display a virtual image in a driver's field of view, and a display equipped with said device.

There are known motor vehicles comprising a display device, called a head-up display, that can be used to display a virtual image comprising information relating to the state of the motor vehicle or of the traffic, or other information, in the field of view of the vehicle driver.

In particular, there are known head-up displays comprising semi-reflective plates serving to form the virtual image, said semi-reflective plates being configured to stand up above a dashboard of the vehicle. Attempts are being made at the present time to make said plates as unobtrusive as possible.

The invention takes the opposite approach to this tendency, and proposes an image transmission device for a display intended to display a virtual image in a driver's field of view, said transmission device comprising:
  a semi-reflective optical element configured to transmit light rays that can be used to display said virtual image in said field of view, said optical element also being configured to guide the light, and
  a light source emitting a light beam,
said light source and said optical element being located relative to one another in such a way that said beam is emitted by said optical element operating as a light guide.

In this way, said optical element is enriched in a complementary manner, which may serve to provide redundancy or to indicate alerts.

According to various embodiments of the invention, which may be considered separately or in combination:
  said light source comprises at least one light-emitting diode,
  said optical element is a plate, notably a semi-reflective plate,
  said plate has two faces transmitting said rays, said faces being joined by an edge,
  said edge comprises a first part forming an entry face for the light beam,
  said edge comprises a second part forming an exit face for the light beam,
  said edge is beveled at said exit face,
  said entry face is configured so as to be located facing a dashboard of the vehicle,
  said entry face corresponds to one of the sides of a contour of said plate, and said exit face corresponds to the other sides of said contour,
  said light source comprises a plurality of light-emitting diodes arranged along said entry face,
  said diodes are of different colors,
  said device comprises a flexible conductor for supplying power to said diodes,
  said diodes are arranged on said flexible conductor.

The invention also relates to a display comprising an image transmission device as described above.

Said display may comprise means for activating the light source.

According to one aspect of the invention, said activation means are configured to make said light source operate in an alternating manner, notably in the same way as a flashing light.

Said display may also comprise means for controlling an image generation device of said display, said control means being configured to control said activation means. Said image generation device comprises, for example, a light source provided with one or more laser diodes.

Figure 2:
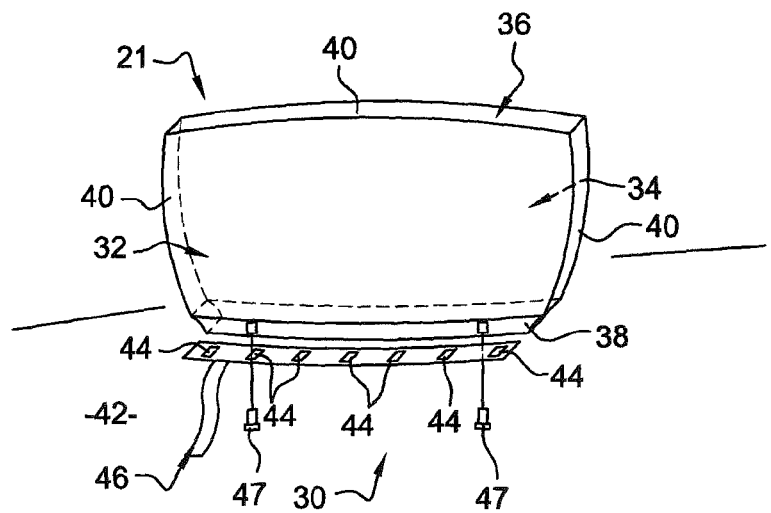

These characteristics and advantages of the invention, as well as others, will be more fully evident from the following description of embodiments of the invention, given with reference to the attached drawings, in which:

FIG. 1 is a schematic view in elevation of a vehicle image display according to the invention, and FIG. 2 is a schematic representation, in perspective, of an exemplary embodiment of a transmission device fitted to a display such as that of FIG. 1.

In the following description, identical references are used to denote similar or identical elements.

As shown in FIG. 1, the invention relates to a display 1, also called a head-up display, for displaying a virtual image 9 in the field of view of a vehicle driver 5 observing a movement trajectory of the motor vehicle.

The display 1 comprises an image generation device 11. Said device comprises, for example, a scanning projector 34 having one or more light sources, each emitting a beam of the laser type. These sources are, for example, laser sources, typically laser diodes, each laser source emitting a monochromatic beam, that is to say a beam consisting of a single color.

Said device may typically comprise three sources, said device being configured to form a light beam, by bringing together, by combination, beams individually emitted by each of said sources. More precisely, the sources used may emit beams whose color differs from one source to another. The colors are, for example, red, green or blue (RGB).

The optical power of each of the sources is controlled independently, using the supply current of the laser source or sources. At a given optical power, the color of the light beam is determined by the way in which a power ratio is established between the different laser diodes. For example, in order to obtain white light, the proportions of the optical powers must be established according to the following distribution: 60 for the green diode, 30 for the blue diode, and 10 for the red diode. The optical power of each of the sources may also be controlled so as to modulate the optical power of the light beam.

The beams emitted by each of the sources are oriented, for example, parallel to one other, and are reflected in the same direction, so as to form a common light beam by combination. For this purpose, said device comprises optical elements which are semi-transparent over a range of wavelengths, such as dichroic mirrors or combination plates, intercepting the beams emitted by each of said sources and combining them in the direction of said beam.

More generally, said device is configured to form said light beam from said laser beam or beams, regardless of the number of sources used. In the case of a single source, the light beam is composed of the light beam emitted by the sole source used, and the resulting image will then be monochrome, being composed of different levels of optical power applied to each of the points making it up, according to a shading of said color. In the case of a plurality of sources, typically the three sources mentioned above, said common beam which then forms said light beam can be used to establish an image according to a color spectrum whose resolution corresponds to the fineness of control of the power supply to said sources.

Said device may also comprise means for controlling the current supply to said sources. As mentioned above, they may allow a choice of the color of the light beam.

Said scanning projector further comprises, for example, a scanning generator which serves to move horizontally and vertically the light beam emitted by the light source or sources, so as to provide scanning at a frequency which, by way of non-limiting example, is notably equal to 60 Hz. The scanning generator comprises, notably, a scanning mirror with a microelectromechanical system (hereafter referred to as a MEMS mirror) from which the light beam emitted by the light source or sources is reflected in a scanning beam 10. A MEMS mirror of this type has, for example, a diameter of 1 mm$^2$. The MEMS mirror can rotate about two axes of rotation to carry out the scanning, at the refreshment frequency of 60 Hz for example, of a diffuser screen 29 of said device. Said image is then formed on said diffuser 29. Alternatively, the MEMS mirror may be replaced with two flat movable mirrors whose movements are associated. One of these mirrors may be used for scanning along a horizontal axis, while the other mirror may be used for scanning along the vertical.

The diffuser 29 where the image is formed may be a transparent projection screen with a complex structure for transparent projection. Alternatively, it may be semi-transparent. It is made, for example, of glass, notably ground glass, or polycarbonate. By way of example, the diffuser screen 29 is of the exit pupil type ("Exit Pupil Expander"). It can be used to provide a wider cone of observation. It extends in a plane through which the light beam passes, the image produced by this scanning beam 10 being formed in the plane of a face of the diffuser screen 29.

This diffuser screen receives the scanning beam 10. It is arranged to create a dispersion of this scanning beam 10 over an angular sector which, for example, is equal to 30° relative to the direction of the scanning beam 10 at the moment when it strikes the diffuser screen 29. For this purpose, according to a non-limiting example, one face of the diffuser screen is uneven, in the sense that it has rough areas which cause the scanning beam to be dispersed. The uneven face is that through which the beam exits, in other words the face on which the image is formed.

Downstream of the diffuser screen 29 in the direction of movement of the light beam, said display comprises at least a semi-reflective optical element 21 and, optionally, a reflection device 25 interposed on the path of the image between the diffuser screen 29 and said semi-reflective optical element 21. In this figure, the path of the image is indicated by arrows which are reflected from the reflection device 25 before being displayed via said semi-reflective optical element 21. The latter element may enable the image 9 to be enlarged and/or displayed by transparency beyond said semi-reflective optical element 21, notably beyond the windshield of the vehicle to which the display is fitted, at the position of a virtual screen, provided with the aid of said semi-reflective optical element 21.

This semi-reflective optical element 21 is advantageously transparent and has a reflectivity of at least 20%, enabling the user to see the route taken by the vehicle through said transmission device, while benefiting from enhanced contrast allowing the displayed image to be viewed.

Accordingly, as shown in FIG. 2, the invention also relates to an image transmission device comprising a semi-reflective optical element 21 as mentioned above, namely an optical element 21 configured to transmit light rays that can be used to display said virtual image in said field of view of the driver. According to the invention, said optical element 21 is also configured to guide the light.

Said transmission device further comprises a light source 30 emitting a light beam. Said light source 30 and said optical element 21 are also located relative to one another in such a way that said beam is emitted by said optical element 21 operating as a light guide. In other words, the light emitted by said light source 30 is guided by said optical element and is perceived by the observer, in particular the driver, via said optical element 21.

Said optical element 21 is, for example, a plate, particularly a semi-reflective plate. Said plate may have two faces 32, 34 transmitting the rays forming the virtual image 9, said faces being joined by an edge 36. Said edge 36 comprises a first part forming an entry face 38 for the light beam emitted by said light source 30 of said transmission device. Said edge 36 also comprises a second part forming an exit face 40 for said light beam. In other words, in this case, said optical element 21 emits the light received from said light source 30 at the position of said exit face 40. Thus the illumination of the semi-reflective edge of the plate 21 is available to the driver, in addition to the information contained in said virtual image 9.

By way of example, said illumination may be used in order to draw the driver's attention to a hazard, by choosing an appropriate color, in particular red. Evidently, other examples of color are possible.

Said edge 36 may be ground, notably by graining, particularly at said exit face 40. Advantageously, it has a beveled cross section so as to be made more visible to the driver.

In this case, said entry face 38 is configured so as to be located facing a dashboard 42 of the vehicle.

Said entry face 38 corresponds to one of the sides of a contour of said plate 21, and said exit face 40 corresponds to the other sides of said contour. This contour may be rectangular, said entry face 38 being formed by one of the longer sides of said plate 21, and said exit face 40 being formed by its other three sides.

Said light source 30 of said transmission device comprises one or more light-emitting diodes 44, in this case a plurality of diodes arranged along said entry face 38. Said diode or diodes may be red, orange and/or another color. In other words, said light-emitting diodes 44 may all be of the same color, to provide higher luminous intensity, or of different colors, to vary the coloring chosen for the edge of the plate 21.

In this case, said transmission device comprises a flexible conductor 46 for supplying power to said diodes 44, said diodes 44 being arranged on said flexible conductor. Said flexible conductor 46 may be attached to the dashboard 42 and/or to said plate 21 by fastening means 47.

Accordingly, said display advantageously comprises means for activating the light source 30. They may be configured for making said light source 30 operate in an alternating manner, notably in order to provide it with a flashing repeat function by means of alternating illumination of the edge of said plate 21. The light-emitting diode or diodes 44 that are used are, for example, orange in color.

Said image generation device 11 of said display comprises, in this case, control means 33 (FIG. 1), comprising, notably, the means for controlling the current supply to the light sources of the display. Said control means are advantageously configured so that they also control said means for activating the light source of said transmission device.

In this case, a light sensor 13 is integrated into said image generation device 11 so as to receive a light beam whose direction is the reverse of that 19 of the emission of said image, namely a direction toward the image generation device 11. This light beam in the reverse direction corresponds to the ambient illumination present at the position of said image, for example to the level of the ambient background illumination, particularly the ambient illumination transmitted by said semi-reflective plate 21 or said windshield on which said virtual image 9 can be displayed, as shown in FIG. 1.

The invention claimed is:

1. An image transmission device for a display intended to display a virtual image in the field of view of a driver, said transmission device comprising:
  a semi-reflective optical element configured to transmit light rays originating from an image generation device, wherein the optical element displays said virtual image, originating from the image generation device, in said field of view in a first plane, and wherein said optical element is also configured to guide the light; and
  a light source, different from the image generation device, emitting a light beam that enters the optical element in a second plane, substantially perpendicular to the first plane;
  said light source and said optical element being located relative to one another in such a way that said beam is emitted by said optical element operating as a light guide.

2. The device as claimed in claim 1, wherein said light source comprises at least one light-emitting diode.

3. The device according to claim 1, wherein said optical element is a plate.

4. The device as claimed in claim 3, wherein said plate is semi-reflective.

5. The device as claimed in claim 3, wherein said plate comprises two faces transmitting said rays, said faces being joined by an edge, and said faces being parallel to the first plane.

6. The device as claimed in claim 5, wherein said edge comprises a first part, in the second plane, forming an entry face for the light beam.

7. The device as claimed in claim 6, wherein said edge comprises a second part forming an exit face for the light beam.

8. The device as claimed in claim 6, wherein said entry face is configured so as to be located facing a dashboard of the vehicle.

9. The device as claimed in claim 6, wherein said entry face corresponds to one of the sides of a contour of said plate, and said exit face corresponds to the other sides of said contour.

10. The device as claimed in claim 9, wherein said device comprises a flexible conductor for supplying power to said diodes, said diodes being arranged on said flexible conductor.

11. The device as claimed in claim 6, wherein said light source comprises a plurality of light-emitting diodes arranged along said entry face.

12. A display comprising an image transmission device as claimed in claim 1.

13. The display as claimed in claim 12, comprising means for activating the light source.

14. The display as claimed in claim 13, wherein said activation means are configured to make said light source operate in an alternating manner.

15. The display as claimed in claim 14, comprising means for controlling an image generation device of said display, said control means being configured to control said activation means.

16. The display as claimed in claim 15, wherein said image generation device comprises a light source provided with one or more laser diodes.

* * * * *